United States Patent [19]

MacLean et al.

[11] 4,086,064
[45] Apr. 25, 1978

[54] APPARATUS FOR FLUIDIZED CATALYTIC CRACKING

[75] Inventors: John P. MacLean, Stafford; John C. Strickland, Houston, both of Tex.

[73] Assignee: Texaco Inc., New York, N.Y.

[21] Appl. No.: 748,090

[22] Filed: Dec. 6, 1976

[51] Int. Cl.² .............................................. B01J 8/24
[52] U.S. Cl. .............................. 23/288 G; 23/288 E; 208/164; 208/78; 208/120; 302/63; 239/498; 239/590.5
[58] Field of Search .................... 23/288 G, 288 E; 208/164, 78, 120; 302/63; 239/498, 590.5

[56] References Cited
U.S. PATENT DOCUMENTS

| 3,607,126 | 9/1971 | Pfeiffer | 23/288 E |
| 3,619,415 | 11/1971 | Jones et al. | 23/288 G X |

*Primary Examiner*—James H. Tayman, Jr.
*Attorney, Agent, or Firm*—Thomas H. Whaley; Carl G. Ries; Douglas H. May, Jr.

[57] ABSTRACT

In a fluidized catalytic cracking unit a riser discharge head for discharging catalyst and hydrocarbon vapor from a riser conduit substantially vertically downward into a vertical reaction vessel such that erosion of the discharge head and the reaction walls is avoided.

9 Claims, 3 Drawing Figures

APPARATUS FOR FLUIDIZED CATALYTIC CRACKING

The present invention relates to apparatus for fluidized catalytic cracking of hydrocarbons. More particularly, the present application relates to an improved riser discharge head for discharging a mixture of fluidized cracking catalyst and hydrocarbon vapors at cracking conditions into a reactor vessel such that erosion by impinging catalyst on the riser discharge means and on the reactor vessel walls is substantially eliminated.

Commonly in fluidized catalytic cracking processes, hot, regenerated catalyst and hydrocarbon charge stock are combined in the lower portion of a riser reactor conduit wherein the hot catalyst vaporizes and catalyzes cracking of the hydrocarbon charge stock. Catalyst and hydrocarbon vapor flow upwardly through the riser reactor conduit at cracking conditions including velocities in the range of 10 to 60 ft/sec, temperatures in the range of 850° to 1300° F and catalyst to hydrocarbon weight ratios in the range of about 2/1 to 20/1. At the upper end of the riser reactor conduit, the catalyst-hydrocarbon vapor mixture enters a riser discharge means from which the mixture is discharged into a reactor vessel. In the reactor vessel, catalyst and hydrocarbon vapor disengage, forming a hydrocarbon vapor phase and a fluidized catalyst phase. Rapid disengagement of catalyst and hydrocarbon vapor in the reactor vessel is advantageous for improved cracked hydrocarbon product quality and yield.

In the prior art, riser reactor conduits may enter the reactor vessels vertically, horizontally or at angles up to about 45° from the vertical. Riser discharge means may comprise an open end of a vertical riser, rough cut cyclones, etc. Of particular interest in the present application is the riser discharge means as shown in U.S. Pat. Nos. 3,619,415; 3,690,841; 3,751,359; 3,801,493; 3,433,733; 3,714,024; 3,784,463; 3,448,037; 3,394,075 and 3,784,360. In the U.S. Patents, the riser conduit enters the reactor vessel at an upwardly directed angle to the vertical, terminating at the reactor vessel centerline in a riser outlet means which allows discharge of the catalyst-hydrocarbon vapor mixture downward into the reactor vessel at angle to the vertical. Such downward discharge enhances rapid separation of hydrocarbon vapor from catalyst, thus reducing accumulation of coke on the spent catalyst and preventing overcracking of hydrocarbons due to extended contact with the catalyst. A disadvantage of the riser outlet means of the U.S. Patents is; the catalyst, discharging at an angle to the vertical, may impinge upon the wall of the reactor vessel, causing severe erosion of the reactor vessel wall.

SUMMARY OF THE INVENTION

Now, according to the improvement of the present invention, fluidized catalytic cracking apparatus is disclosed which comprises a riser reactor conduit entering a reactor vessel upwardly at an angle of about 30° to about 45° from the vertical, terminating in an improved riser discharge head which discharges a catalyst-hydrocarbon vapor mixture substantially vertically downward into the axial center of the reactor vessel.

Advantages of the improved apparatus of the present invention include: the riser reactor conduit enters through the side wall of the reactor vessel such that additional room is available in the bottom of the reactor vessel for other apparatus associated with fluidized catalytic cracking units, such as stripping means, catalyst withdrawal means, etc. Additionally, the substantially vertical discharge of catalyst and hydrocarbon vapor from the riser discharge means into the reactor vessel prevents erosion of the reactor vessel wall by impinging catalyst. Also, erosion of the riser discharge means by impinging catalyst from the riser conduit is substantially eliminated. These and other advantages will be set-out in the detailed description of the invention below.

DETAILED DESCRIPTION OF THE INVENTION

A description of the improved apparatus of the present invention may be given by reference to the appended drawings.

Figure 1:
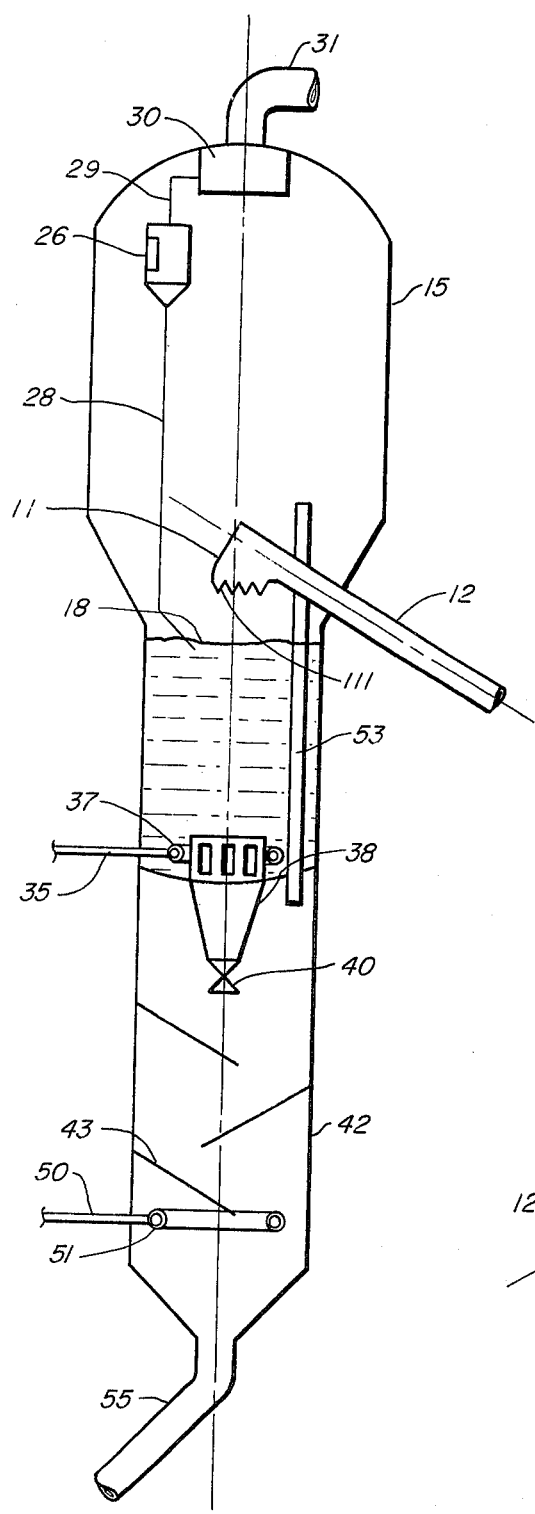
FIG. 1 is a schematic representation of a fluidized catalytic cracking reactor vessel showing orientation of a riser reactor conduit and the improved riser discharge head of the present invention.

In FIG. 1, a suspension of catalyst and gas-oil vapor, at a temperature of about 920° F, and at an average velocity of about 33 feet per second passes upward through riser conduit 12 into reactor vessel 15 containing a fluidized dense phase catalyst bed with upper surface 18. Riser conduit 12 terminates in a riser discharge head 11 having a serrated edge 111. The riser discharge head 11 directs catalyst and oil vapor discharging from riser conduit 12 substantially vertically downward into the fluidized dense phase catalyst bed such that discharging catalyst does not impinge upon the walls of reactor vessel 15. The serrated edge 17 provides smooth flow of hydrocarbon vapors 12 into reactor vessel 15, particularly when the dense phase bed level 18 fluctuates near the outlet of discharge head 11 as defined by the serrated edge 17. Conditions in riser conduit 12 include a catalyst to oil weight ratio of 5.6/1, and a weight hourly space velocity of 69.5 lb. cat/hr/lb. oil. Vapor velocity within the riser conduit 12 is about 40 ft/sec providing a residence time in the riser of about 4.0 seconds. Substantial conversion of hydrocarbon vapor to lower molecular weight hydrocarbons boiling below about 430° F occurs in the riser conduit at these conditions, and amounts to a conversion of about 65 weight percent. Conditions in the fluidized dense phase catalyst bed in reactor vessel 15 include a catalyst to oil weight ratio of 12.3, and and a weight hourly space velocity of 3.0. Vapor velocities in reactor vessel 15 are 1.7 ft/sec within the dense phase bed, 3.1 feet per second at the point where riser discharge head 11 discharges, and 1.5 feet per second in the upper portion of reactor vessel 15. Cracked hydrocarbon vapors disengage from the catalyst in the dense phase bed at upper surface 18 at a velocity of about 3.1 feet per second, which velocity continues to drop as the vapors pass upward toward cyclone 26. Hydrocarbon vapors and entrained catalyst pass through cyclone 26 wherein entrained catalyst is separated and returned to the fluidized dense phase bed through dipleg 28. Although a single cyclone 26 is shown for clarity, it will be understood that several cyclones may be assembled in series and in parallel to achieve substantially complete separation of catalyst from hydrocarbon vapors. Effluent gasses pass from cyclone 26 through line 29 to plenum chamber 30 through which the hydrocarbon vapors are discharged from reactor vessel 15 via vapor line 31. Vapor line 31 conveys the cracked hydrocarbon vapors to fractionation facilities, not shown, wherein such vapors are recovered and separated into desired product and recycle streams.

In FIG. 1, steam, in line 35 is passed to steam ring 37 and discharges into the lower portion of reactor 15. Catalyst in the fluidized dense phase bed present in reactor vessel 15 is stripped of occluded hydrocarbon by such steam from steam ring 37 and passes downward through standpipe 38 and slide valve 40 into stripper 42. Stripper 42 is provided with baffles 43 attached to the wall of stripper 42, below baffles 43. Steam rising through stripper 42 removes occluded and entrained hydrocarbons from the catalyst, and such steam and hydrocarbon vapors pass upwardly through stripper vent line 53 discharging into the upper portion of reactor 15. Stripped catalyst is withdrawn from the bottom of stripper 42 through spent catalyst standpipe 55 and is passed to a catalyst regeneration section, not shown.

Figure 3:
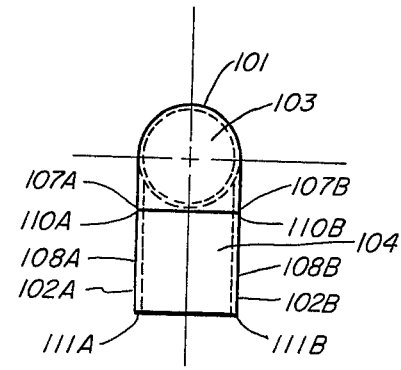
FIG. 3 is a section 3—3 of FIG. 2, showing a schematic front view of the riser discharge head.
Figure 2:
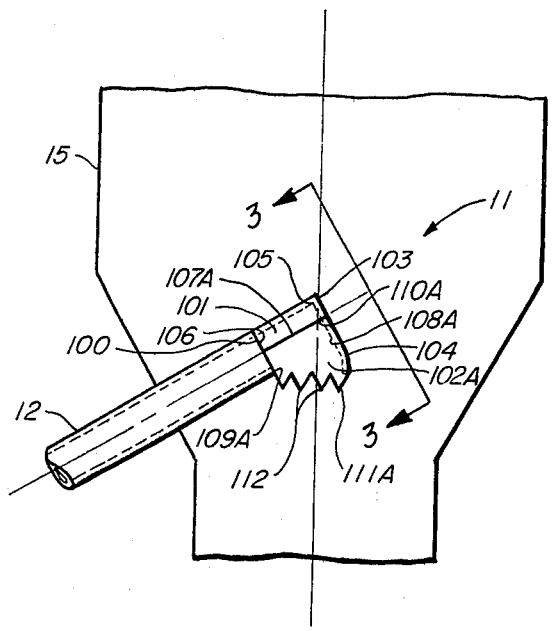
FIG. 2 is a schematic representation of the side view of a riser reactor conduit and the improved riser discharge head of the present invention, showing additional details.

FIG. 2 is a detailed schematic representation of the side view of riser discharge head 11 and riser conduit 12 upper portion, and FIG. 3 is projection 3—3 of FIG. 2, showing a front view of riser discharge head 11. In FIG. 2 and FIG. 3, riser conduit 12 extends through the wall or reactor vessel 15, and comprises a hollow cylindrical member (12) inclined upwardly at an angle of from about 30° to about 45° from the vertical, having a longitudinal central axis, and terminating in an upper discharge end 100 comprising a circular edge which defines a circular cross-sectional area perpendicular to said longitudinal central axis.

In FIG. 2 and FIG. 3, said riser discharge head 11 comprises an arcuate portion 101, two legs 102A and 102B, an upper front cover portion 103 having a flat planar surface, and a lower front cover portion 104 having a curved planar surface.

In FIG. 2 and FIG. 3, said arcuate portion 101 comprises a hollow half cylinder, of the same radius as the discharge end 100 of said riser conduit 12, having a foreward semicircular edge 105, a read semicircular edge 106, and two longitudinal edges 107A and 107B. The rear edge 106 of said arcuate portion 101 is attached to the upper half of circular edge 100 of riser conduit 12, such that said arcuate portion 101 is coaxial with the longitudinal central axis with the longitudinal central axis of riser conduit 12. The length of said arcuate portions longitudinal edges 107A and 107B is equivalent to about 1-3 diameters of discharge end 100 of riser conduit 12, and preferably is equivalent to about 2 diameters.

In FIG. 2 and FIG. 3 said flat, planar legs 102A and 102B have respectively, forward edges 108A and 108B, straight rear edges 109A and 109B equivalent in length to the radius of riser conduit discharge end 100, straight upper edges 110A and 110B equal in length to the longitudinal edges 107A and 107B of said arcuate portion 101, and bottom edges 111A and 111B having a straight length equal to the length of longitudinal edges 107A and 107B. Bottom edges 111A and 111B are serrated such that a plurality of triangular protrusions 112 define a plurality of triangular gaps in bottom edges 111A and 111B. Preferably, each triangular protrusion 112 has one edge parallel with riser conduit 112 longitudinal central axis and the other edge perpendicular to said longitudinal central axis. The upper edges 110A and 110B of legs 102A and 102B are respectively connected to longitudinal edges 107A and 107B of arcuate portion 101 such that legs 102A and 102B extend downward and such that rear edges 109A and 109B are in line with arcuate portion rear edge 106, and are perpendicular to riser conduit 12 longitudinal central axis.

In FIG. 2 and FIG. 3, each leg forward edge 108A and 108B extends downward, in line with arcuate portion foreward edge 105 and perpendicular to the riser conduit 12 longitudinal central axis, for a distance equivalent to the radius of said riser conduit 12 discharge, then each leg foreward edge 108A and 108B continues downward describing the arc of a circle having a center at the point of joinder of the legs' rear edges 109 with the legs' bottom edges 111 and having radius equivalent to the length of arcuate portion longitudinal edge 107, wherein the included angle described by said arc is such that the straight length of bottom edge 111 is horizontal, and is perpendicular to the vertical central axis of reactor vessel 15.

In FIG. 2 and FIG. 3, flat planer upper cover plate 103 is attached at its edges to arcuate portion foreward edge 105 and straight portions of leg foreward edges 108A and 108B such that flat planer cover plate 103 is perpendicular to the riser conduit discharge longitudinal central axis. Curved planar lower cover plate 104 is attached, at its edges to the edge of upper cover plate 103 and the curved portions of legs' foreward edges 108A and 108B. As the flowing catalyst-hydrocarbon vapor mixture exits upper discharge end 100 of riser conduit 12, the mixture expands and develops, flow components not parallel to the longitudinal axis of riser conduit 12. Flat planar cover plate intercepts the portion of the flowing mixture which is flowing parallel to the longitudinal central axis, while curved cover plate 104 is arranged such that the non-parallel flow components of the mixture impinge nearly perpendicular to the surface of curved cover plate 104.

In FIG. 2 and FIG. 3, a preferred arrangement for riser discharge 11 is at a position within reactor vessel 15 such that the riser longitudinal central axis intersects the reactor vessels vertical center line at the face of upper cover plate 103. In this arrangement, catalyst and hydrocarbon vapor flow downward from riser discharge head 11 into the axial center of reactor vessel 15, thus ensuring even distribution of catalyst and hydrocarbon vapor.

In operation, catalyst and hydrocarbon vapors flow upward in riser conduit 12 at cracking temperatures and pressures, and at a velocity in the range of about 10-60 ft/sec. From riser conduit discharge end 100, catalyst and hydrocarbon vapors flow into discharger head 11. Momentum carries catalyst foreward, and the catalyst impinges upon the inner side of cover plates 103 and 104. Minimum erosion by catalyst impinging upon a surface is experienced when the angle of impingement is 90°. Cover plates 103 and 104 are arranged such that they are at an angle of 90° to the direction of flow of catalyst from the riser conduit discharge end 100. Thus, the erosion effect of catalyst impingement is reduced. From riser conduit discharge 100, hydrocarbon vapors flow into discharge head 11, and flow downward into reactor vessel 15. Catalyst, after impingment upon cover plates 103 and 104, flows downward into reactor vessel 15 along with the hydrocarbon vapors. Curved cover plate 104 also directs the flow of hydrocarbon vapors and catalyst in a smooth pattern such that the direction of hydrocarbon vapor and catalyst flow is substantially vertically downward as the flow exits discharge head 11 into reactor vessel 15. Thus, erosion of discharge head 11 by impinging catalyst is minimized by providing an impingement surface (cover plates 103 and 104) at an angle of about 90° to the direction of catalyst flow, and erosion of the walls of reactor vessel 15 is eliminated by directing the flow of catalyst vertically downward into reactor vessel 15. This is a substantial improvement to the riser discharge means as shown in the patents heretofore referenced, wherein catalyst flow into a reactor vessel was at a substantial angle to vertical such that catalyst could impinge upon the vessel walls. Such impingement of catalyst is likely to cause severe erosion of the reactor vessel walls.

Conventionally, riser discharge head 11 is constructed of steel plate with elements joined by welding, although other methods of construction may suitably be employed. As desired, the interior of riser discharge head 11 may be lined with refractory linings to minimize abrasion, although such lining is not necessary with the improved riser discharge head 11 of the present invention.

As will be apparent to those skilled in the art, modifications and changes are possible to the present invention, as disclosed in the foregoing specification and drawings, without departing from the spirit and scope thereof. Therefore, the only limitations intended of the present invention are those continued within the appended claims. We Claim:

1. In a fluidized catalytic cracking apparatus comprising vertical reactor vessel (15), wherein a riser conduit (12), having a discharge end (100), enters said reactor vessel (15) through a side wall thereof upwardly at an angle of about 30° to 45° to the vertical, wherein catalyst and hydrocarbon vapors flow upwardly through said riser conduit (12) and discharge into said reactor vessel (15); an improved riser discharge head (11) comprising:
   a. a body portion, connected to the discharge end (100) of said riser conduit (12);
   b. foreward impingement plates (103 and 104), attached to said body portion, in an attitude normal to the flow of catalyst and hydrocarbon vapor from riser conduit discharge (100); and
   c. means for directing hydrocarbon vapors and catalyst, after impingement upon said foreward impingement plate (103), substantially vertically downward into the interior of reactor vessel (15).

2. The apparatus of claim 1, wherein said riser discharge head (11) is positioned within said reactor vessel (15) such that catalyst and hydrocarbon vapors are discharged substantially vertically downward at the vertical central axis of said reactor vessel (15).

3. The apparatus of claim 2 wherein said body portion comprises an arcuate portion (101) coaxial with the longitudinal central axis of said riser conduit discharge end (100), two legs (102A and 102B) extending downward from said arcuate portion, and a lower cover plate (104).

4. The apparatus of claim 3 wherein said arcuate portion (101) is a hollow half cylinder, having a radius equal to the radius of said riser conduit discharge end (100), having a semicircular rear edge (106) connected to said riser conduit discharge end (100), having a semicircular foreward edge (105) connected to said front impingement plate (103), and having two longitudinal edges (107A and 107B) facing downward.

5. The apparatus of claim 4 wherein said legs (102A and 102B) are flat planar members, each having an upper edge (110) equal in length to an arcuate portion longitudinal edge (107); a rear edge (109) having a length equivalent to the radius of riser conduit (12), a front edge (108) having a straight upper portion equivalent in length to the radius of said riser conduit (12) and a curved lower portion; and a bottom edge wherein said leg upper edge (110) is connected to an arcuate portion longitudinal edge (107) such that each leg rear edge (109) is in line with said arcuate portion of rear edge (106) and such that the upper portion of each leg foreward edge (108) is in line with said arcuate portion foreward edge (105); and wherein said foreward impingement plate (103) is attached by its edges to each leg foreward edge (108).

6. The apparatus of claim 5 wherein the curved lower portion of each leg foreward edge 108 describes an arc of a circle having a radius equivalent in length to the length of said arcuate portion longitudinal edge (107) and having a center of the point of joinder of said leg rear edge (109) and said leg bottom edge (111).

7. The apparatus of claim 6 wherein said leg bottom edge (111) is horizontal.

8. The apparatus of claim 7 wherein a lower cover plate (104) is attached to the bottom edge of said upper cover plate (103) and is attached to the lower curved portion of each leg foreward edge (108), for directing catalyst and hydrocarbon vapor substantially vertically downward into said reactor vessel (15).

9. The apparatus of claim 8 wherein each leg bottom edge (111) is serrated to form a plurality of triangular shaped protrusions defining a plurality of triangular shaped notches.

* * * * *